2,625,118

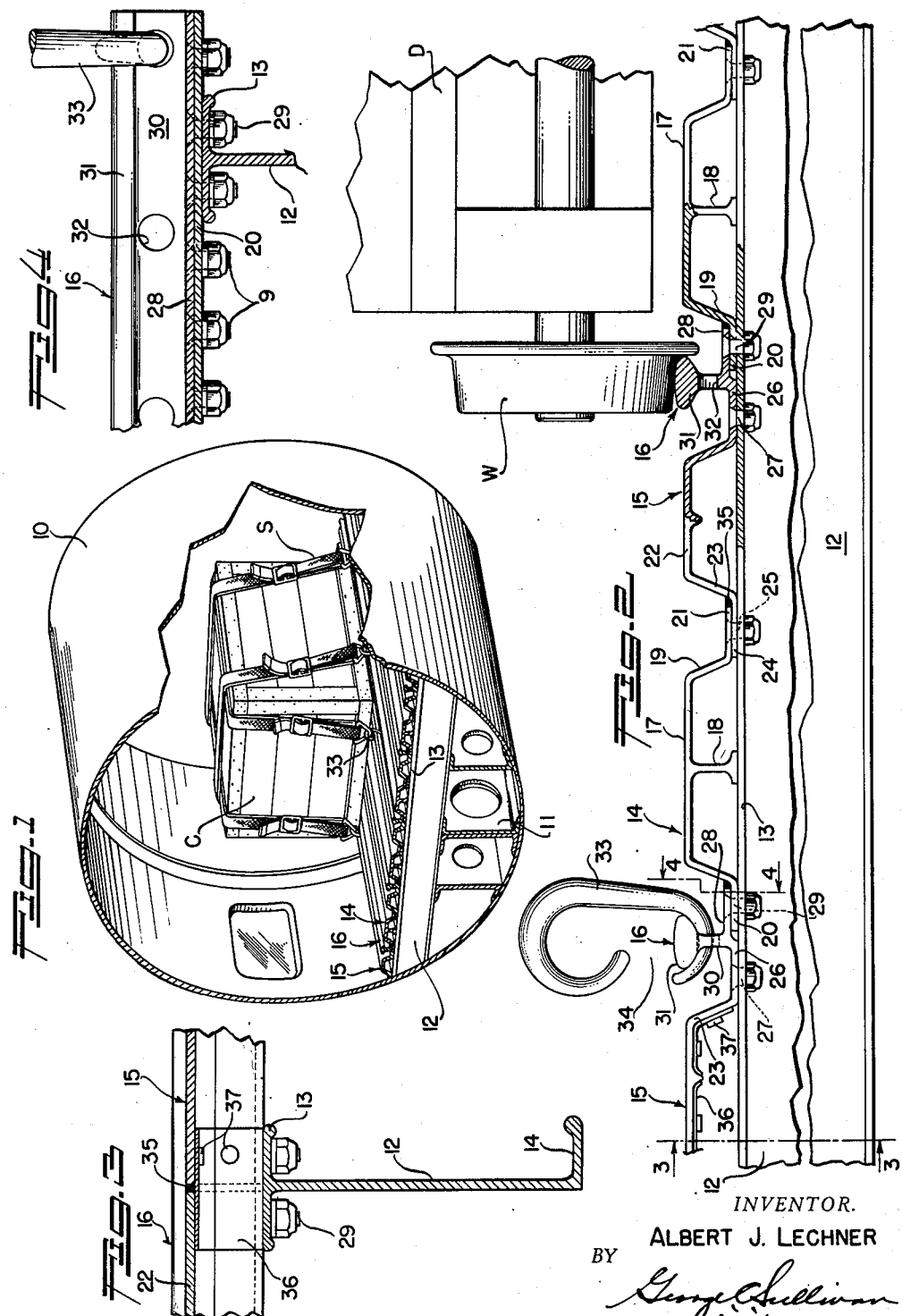
Jan. 13, 1953  A. J. LECHNER  2,625,118
AIRCRAFT CARGO FLOOR
Filed March 22, 1949
INVENTOR.
ALBERT J. LECHNER
BY George C. Sullivan
Agent Patented Jan. 13, 1953

UNITED STATES PATENT OFFICE 2,625,118

AIRCRAFT CARGO FLOOR

Albert J. Lechner, North Hollywood, Calif., assignor to Lockheed Aircraft Corporation, Burbank, Calif.

Application March 22, 1949, Serial No. 82,742

6 Claims. (Cl. 105—367)

1

This invention relates to floor construction and relates more particularly to floors for the cargo compartments of airplanes and other vehicles. It is a general object of the invention to provide a practical, durable and low-cost floor of this character which facilitates the handling, stowage and securing of cargo.

The floors of the cargo compartments of aircraft, and the like, have not been very satisfactory. In the case of airplanes, it has been the practice to construct the floors of plywood or sheets of aluminum alloy, which are not particularly durable or well suited for the support of concentrated loads. Separate skid rails are often secured to the floors to facilitate the handling of the cargo and large numbers of fixed tie-down rings are usually attached to the floor structure so that the cargo may be anchored in place. Such floors are high in initial cost and are difficult and expensive to repair.

It is an object of the present invention to provide a relatively low-cost floor for aircraft cargo compartments, and the like, that is serviceable and long wearing and that may be easily and inexpensively repaired. The floor of the invention comprises a plurality of extruded metal sections that are quickly and inexpensively installed and that are strong and long wearing. Furthermore, the individual extruded floor sections may be easily replaced in the event they become worn or broken, thus permitting repair of the floor in the field.

Another object of the invention is to provide a floor of the character referred to in which the extruded metal sections, or at least some of the sections, incorporate integral rails that are available for wheeled dollies and for sliding or skidding the articles of cargo during loading and unloading operations. The skid rails, being formed integral with the floor sections themselves, obviate the necessity for installing separate rails or skids on the floor. This markedly reduces cost of the installation and results in a more durable and practical floor assembly. Where the rails are elevated slightly above the principal floor surfaces they constitute strong load carrying elements.

A further object of the invention is to provide a floor construction of the character described in which the integral skid rails of the floor sections may also serve as tie-down means. In accordance with the invention the skid rails are formed or provided with series of spaced openings for the reception of tie-down hooks or rings which are employed to anchor the straps, ropes or other

2 lashings for the cargo. These openings are spaced along the rails in such a way that the tie-down rings may be advantageously located to secure the particular cargo in the manner desired and the rings may be easily disengaged from the opennigs to leave the rails clear and free when the cargo is to be loaded and unloaded. Thus the integral rails of the floor sections serve not only as tracks for the wheeled dollies and as skids for the cargo, but are also available as hold-down or tie-down means for securing the cargo.

Other objectives and features of the invention will become apparent from the following detailed description throughout which reference will be made to the accompanying drawings wherein:

Figures 1 is a fragmentary perspective view of an airplane fuselage illustrating the floor of the invention incorporated therein;

Figure 2 is an enlarged vertical detailed sectional view of the floor assembly illustrating the manner in which a wheeled dolly may operate over the rails and showing a hold-down ring engaged in a rail;

Figure 3 is an enlarged fragmentary vertical sectional view taken substantially as indicated by line 3—3 on Figure 2; and Figure 4 is an enlarged fragmentary vertical sectional view taken substantially as indicated by line 4—4 on Figure 2.

The floor construction of the invention has many applications and may be varied considerably to adapt it for given uses, etc. In the drawings, I have shown the floor installed or incorporated in the fuselage of a cargo-type airplane, it being understood that this is only one typical form and application of the invention. The portion of the fuselage 10 illustrated, is shown in a diagrammatic manner and is substantially cylindrical in cross section. Spaced fore and aft beams 11, or the equivalent, are provided in the fuselage 10 below the floor and the sub-floor structure includes a plurality of spaced transversals or transverse members 12. These members 12 have horizontal flanges 13 at their upper edges and may have single bulb flanges 14 at their lower edges secured to the beams 11. The invention is not primarily concerned with the sub-floor structure which obviously may vary considerably in different aircraft.

The improved floor of the invention may be said to comprise, generally, a plurality of floor sections 14 and 15 and integral skid-rails and tie-down rails 16 on the sections 15.

The floor sections 14 and 15 are preferably extrusions of selected metal, such as an aluminum alloy, magnesium alloy, or steel, and being extrusions are uniform in cross sectional configuration throughout their lengths, it being apparent from an inspection of the drawings that the sections 15 are different in cross section than the sections 14. The sections 14 and 15 preferably extend fore and aft of the airplane to have their longitudinal axes substantially normal to the sub-floor transverse members 12. In accordance with the invention, the sections 14 and 15 present or constitute the active floor elements, serving to directly support the cargo C. In the form of the invention illustrated, the sections 14 and 15 are alternated, that is there is a section 14 then a section 15 arranged parallel with the section 14, then a section 14, and so on, with the several adjacent sections arranged in parallel and partially overlapping relation as will be more fully described.

Each floor section 14 has a principal or main web 17 which presents a flat cargo carrying upper surface. The web 17 of each section 14 is preferably of substantial width and may be reinforced or supported intermediate its opposite edges by a downwardly projecting strengthening flange 18 which is broadened at its lower edge to bear on the sub-floor members 12. A downwardly and outwardly sloping part 19 extends from each longitudinal edge of the main web 17, one of said parts being provided with a base flange 20 and the other part 19 having a similar flange 21. The base flange 20 is flat and its under side may rest directly upon the transverse sub-floor members 12. The flange 21, which extends along the opposite longitudinal edge of the section 14, lies in a plane parallel with and slightly above the plane of the flange 20 to lap over a portion of the adjacent floor section 15, as described below. Because the sections 14 are extrusions, the parts just described extend uniformly throughout the lengths of the sections.

The floor sections 15 each include a main web 22 resembling but preferably somewhat narrower than the webs 17 of the sections 14. The upper sides of the webs 22 form floor surfaces and lie in the same plane as the upper surfaces of the adjacent webs 17. Thus the top surfaces of the webs 17 and 22 of the alternated floor sections 14 and 15 constitute the primary floor surfaces. Downwardly and outwardly sloping parts 23 extend from the opposite margins of the web 22 of each section 15. One of these parts 23 carries at its lower end an outwardly extending flange 24 which engages or laps under the flange 21 of the adjacent section 14. Suitable fastening devices extend through aligned openings in the overlapping flanges 21 and 24 and the flanges 13 of the transverse members 12 to assist in securing the floor sections to the sub-structure. I have shown countersunk or flush-head screws 25 passing through openings in the flanges 13, 21 and 24 and provided with appropriate nuts. Rows of the screws 25 also connect the flanges 21 and 24 between the spaced transversals 12 to secure the floor sections together throughout their lengths. The sloping parts 23 on the opposite edges or sides of the sections 15 have outwardly extending flanges 26 whose lower sides bear directly on the sub-floor members 12. Screws 27, similar to the screws 25, secure the flanges 26 to the members 12. The base flanges 26 are of substantial width to carry the rails 16 and their outer edge portions are formed to overlap the flanges 20 of the adjacent floor sections 14. The marginal portions 28 of the flanges 26 are raised or stepped upwardly to lap over the flanges 20 and bolts or screws 29 are passed through openings in the overlapping flanges and the flanges 13 of the members 12 to assist in securing the floor sections to the sub-structure. Rows of screws 9 are passed through openings in the overlapping flanges 20 and 26 to secure the sections 14 and 15 together between the spaced transversals 12 and throughout the length of the floor sections.

The rails 16, which are features of the invention, extend along one margin of each floor section 15 projecting upwardly from its flange 26. The rails 16 are integral with the sections 15, being continuous integral parts of the extrusions. The rails 16 may resemble railroad rails having vertical webs 30 and broadened heads 31. The height of the rails 30 may be different in given installations of the floor. Where it is intended to use wheeled dollies extensively and to slide or skid the articles of cargo to a minimum extent, the upper surfaces of the rail 16 may either be flush with or below the surfaces of the webs 17 and 22. In such cases the top surfaces of the rails 16 supplement the surfaces of the webs 17 and 22 as floor faces and load carrying parts. In other instances, the top surfaces of the rails 16 may be slightly above the planes of the webs 17 and 22 so that the rails are available to assist in sliding or skidding the cargo about as well as serving as tracks for the wheels W of the dolly D. The drawings illustrate the tops of the rails 16 as occupying a plane slightly above the plane of the webs 17 and 22, it being understood that this is only one manner of forming the rails. The webs 30 of the rails 16 project upwardly substantially mid-way between the margins of the flanges 26 to be adequately spaced between the raised parts of the adjacent floor sections 14 and 15. Where the rails 16 are provided on corresponding edges of the spaced apart floor sections 15 as illustrated, the spacing of the track-rails is suitable for the wheels W of the dolly D.

As mentioned above, the rails 16 are provided with openings 32 to receive tie-down rings or the like. Thus, as best illustrated in Figures 2 and 4, the web 30 of each rail 16 has a plurality of spaced openings 32. The openings 32 are preferably spaced throughout the length of the rails 16 so as to be available for the reception of rings 33 and the like to hold down the cargo at any point on the floor. The openings 32 are preferably located in the webs 30 at the bases of the rail heads 31 so that the hold-down rings 33 may engage under or cooperate with the heads. As illustrated, the under sides of the heads 31 and the lower arms of the rings or hooks 33 have corresponding or mating radii of curvature so that the rings may swivel or turn on the rail head surfaces to assume practically any required angle. One side of each ring 33 is open at 34 to permit ready engagement of the rings in the rail openings 32 and easy intentional removal of the rings from the openings. The upper arms or parts of the rings 33 are shaped to receive and dependably retain the fittings of the cargo straps S or the like. It will be apparent how the clips or rings 33 may be engaged in any selected openings 32 of the several rails 16 to receive the straps S, or the like, to secure the articles of cargo in various locations throughout the floor.

When it is intended that the aircraft carry wet cargo, or if it is desired to periodically wash down the floor, the several joints of the floor assembly may be sealed to make the same watertight. Thus I have shown sealing compound 35 sealing the joints between the flanges 21 and 24 and the flanges 20 and 28. Where the ends of aligned sections 14 and 15 adjoin, I provide sealing clips 36 at the under sides of the sections. The clips 36 may be of metal and are preferably secured to only one section of each pair of the adjoining floor sections by rivets 37 or the like, as shown in Figure 3. However, when the floor assembly is designed or intended to assume a portion of the primary structural loads of the airplane, the clips 36 may be relatively strong and heavy and are secured to each of the adjoining sections to structurally connect the floor sections. Sealing compound 35 is provided in the gaps or spaces between the adjacent ends of the sections 14 and 15 and is held against displacement by the clips.

From the foregoing detailed description it will be seen that I have provided a simple inexpensive cargo floor that is practical and long wearing. In the event of breakage or the like of one of the sections 14 or 15, the screws 25, 27 and/or 29 of that section are removed and the screws of an adjacent section are loosened to permit removal of the broken or worn section and insertion of a replacement floor section. The floor is relatively light-weight and the fore and aft extending metal sections 14 and 15 may assist in assuming some of the primary bending loads of the fuselage. The rails 16, formed as integral parts of the floor sections 15, materially assist in the handling of the cargo by serving as tracks or skids and also constitute well-distributed tie-down anchors. It is contemplated that the rails 16 be spaced and related so that they may be employed as hold-down means for seats, litters and other airplane fittings and accessories. As the rails 16 extend throughout the floor assembly they are readily available for such purposes.

Having described only a typical form of the invention, I do not wish to be limited to the specific details herein set forth, but wish to reserve to myself any variations or modifications that may appear to those skilled in the art and/or fall within the scope of the following claims.

I claim:

1. A floor assembly for use upon a sub-structure on a cargo vehicle, comprising a plurality of elongate floor sections arranged in parallel relation, each section comprising a horizontal web-portion, two longitudinally-extending downwardly-projecting side portions at the lateral edges of said web portion and two longitudinally-extending, horizontal edge flanges along the longitudinal bottom edges of said side portions, said horizontal web portions all lying in the same plane, and the adjacent side portions of adjacent floor sections being spaced apart, and longitudinally extending rails arranged parallel to said floor sections and disposed between adjacent side portions of adjacent floor sections, each of said rails having a vertical web portion and a head portion, the web portions of the rails being spaced from the adjacent side portions of the floor sections to provide channels for flanged wheels to roll on the head portions of said rails, said web portions of the rails having means below the plane of said horizontal web portions to cooperate with cargo hold-down means.

2. A floor assembly for use upon a sub-structure on a cargo vehicle, comprising a plurality of elongate floor sections arranged in parallel relation, each section comprising a horizontal web portion, two longitudinally-extending downwardly-projecting side portions at the lateral edges of said web portion and two longitudinally-extending horizontal edge flanges along the longitudinal bottom edges of said side portions, said horizontal web portions all lying in the same plane and the adjacent side portions of adjacent floor sections being spaced apart, and longitudinally-extending rails of general I-shape in cross-section integral with and projecting vertically upwardly from at least some of said flanges between adjacent side portions of adjacent floor sections, said rails being longitudinally parallel to said floor sections and the web portions of said rails being spaced from the adjacent side portions of the floor sections to provide channels for flanged wheels to roll on the heads of said rails, and the web portions of said rails having longitudinally-spaced openings therein below the plane of said horizontal web portions to receive cargo hold-down hooks.

3. A floor assembly for use upon a sub-structure on a cargo vehicle, comprising a plurality of elongate floor sections arranged in parallel relation, each section comprising a horizontal web portion, two longitudinally-extending downwardly-projecting side portions at the lateral edges of said web portion and two longitudinally-extending horizontal edge flanges along the longitudinal bottom edges of said side portions, said horizontal web portions all lying in the same plane and the adjacent side portions of adjacent floor sections being spaced apart, and longitudinally-extending rails of general I-shape in cross-section integral with and projecting vertically upwardly from at least some of said flanges between adjacent side portions of adjacent floor sections, said rails being longitudinally parallel to said floor sections and the web portions of said rails being spaced from the adjacent side portions of the floor sections to provide channels for flanged wheels to roll on the heads of said rails, the web portions of said rails having longitudinally-spaced openings therein below the plane of said horizontal web portions to receive cargo hold-down hooks, and the under sides of the rail heads being convex to cooperate with said hooks.

4. A floor assembly for use upon a sub-structure on a cargo vehicle, comprising a plurality of elongate floor sections arranged in parallel relation, each section comprising a horizontal web portion, two longitudinally-extending downwardly-projecting side portions at the lateral edges of said web portion and two longitudinally-extending horizontal edge flanges along the longitudinal bottom edges of said side portions, said horizontal web portions all lying in the same plane, some of said floor sections having downwardly projecting strengthening flanges between their side portions adapted to seat upon said sub-structure, and others of said floor sections having longitudinally-extending rails integral with and projecting vertically upwardly from at least one of their edge flanges, said rails extending longitudinally parallel to the floor sections and having web portions and head portions, the web portion of each rail being spaced from the adjacent side portions of the floor sections to provide channels for flanged wheels to roll on the head portions of said rails, and the web portions of said rails having longitudinally-spaced openings therein to receive cargo hold-down hooks.

5. A floor assembly for use upon a sub-structure on a cargo vehicle, comprising a plurality of elongate floor sections arranged in parallel relation, each section comprising a horizontal web portion, two longitudinally-extending downwardly-projecting side portions at the lateral edges of said web portion and two longitudinally-extending horizontal edge flanges along the longitudinal bottom edges of said side portions, said horizontal web portions all lying in the same plane, some of said floor sections having downwardly projecting strengthening flanges between their side portions adapted to seat upon said sub-structure, and alternate floor sections having longitudinally extending rails integral with and projecting vertically upwardly from at least one of their edge flanges, said rails extending longitudinally parallel to the floor sections and having web portions and head portions, the web portion of each rail being spaced from the adjacent side portions of the floor sections to provide channels for flanged wheel to roll on the head portions of said rails, and the web portions of said rails having longitudinally-spaced openings therein to receive cargo hold-down hooks.

6. A floor assembly for use upon a sub-structure on a cargo vehicle, comprising a plurality of elongate floor sections arranged in parallel relation, each section comprising a horizontal web portion, two longitudinally-extending downwardly-projecting side portions at the lateral edges of said web portion and two longitudinally-extending horizontal edge flanges along the longitudinal bottom edges of said side portions, said horizontal web portions all lying in the same plane and the adjacent side portions of adjacent floor sections being spaced apart, alternate edge flanges of the floor sections overlapping and being overlapped by, respectively, the adjacent edge flanges of the floor sections, the overlapping portions of the edge flanges having registering openings through which securing means may be passed to fasten the floor sections to said sub-structure, and longitudinally extending rails disposed between adjacent side portions of at least some of the adjacent floor sections to extend parallel to said floor sections, each of said rails having a head portion and a vertically extending web portion, the web portion of each rail being spaced from the adjacent side portions of the floor sections to provide channels for flanged wheels to roll on the head portions of said rails, and the web portion of each rail having longitudinally spaced means thereon below the plane of the horizontal web portions of the floor sections by which to secure cargo hold-down hooks to said rails.

ALBERT J. LECHNER.

REFERENCES CITED

The following references are of record in the file of this patent:

UNITED STATES PATENTS

| Number | Name | Date |
|---|---|---|
| 1,512,771 | Lawler et al. | Oct. 21, 1924 |
| 1,841,066 | Simning | Jan. 12, 1932 |
| 1,843,062 | Bradley | Jan. 26, 1932 |
| 2,047,503 | Wilson et al. | July 14, 1936 |
| 2,235,865 | Burgess | Mar. 25, 1941 |
| 2,392,789 | Watter | Jan. 8, 1946 |
| 2,441,913 | Taylor | May 18, 1948 |